Dec. 8, 1925.                                                      1,564,516
                        L. BREGUET
      DEVICE FOR THE AUTOMATIC COUPLING AND UNCOUPLING
      OF ENGINES OPERATING UPON A COMMON PROPELLER
                 Filed Dec. 22, 1921         3 Sheets-Sheet 1
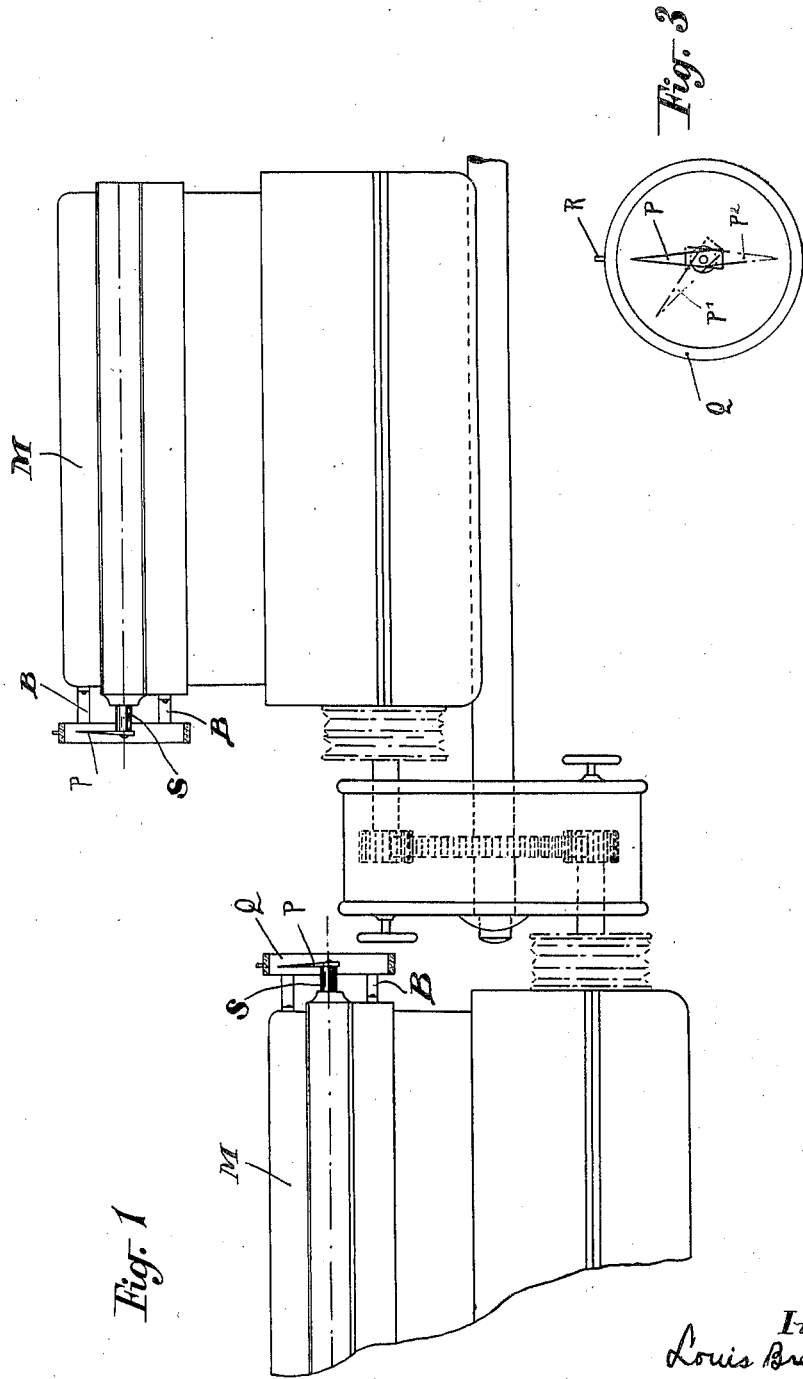

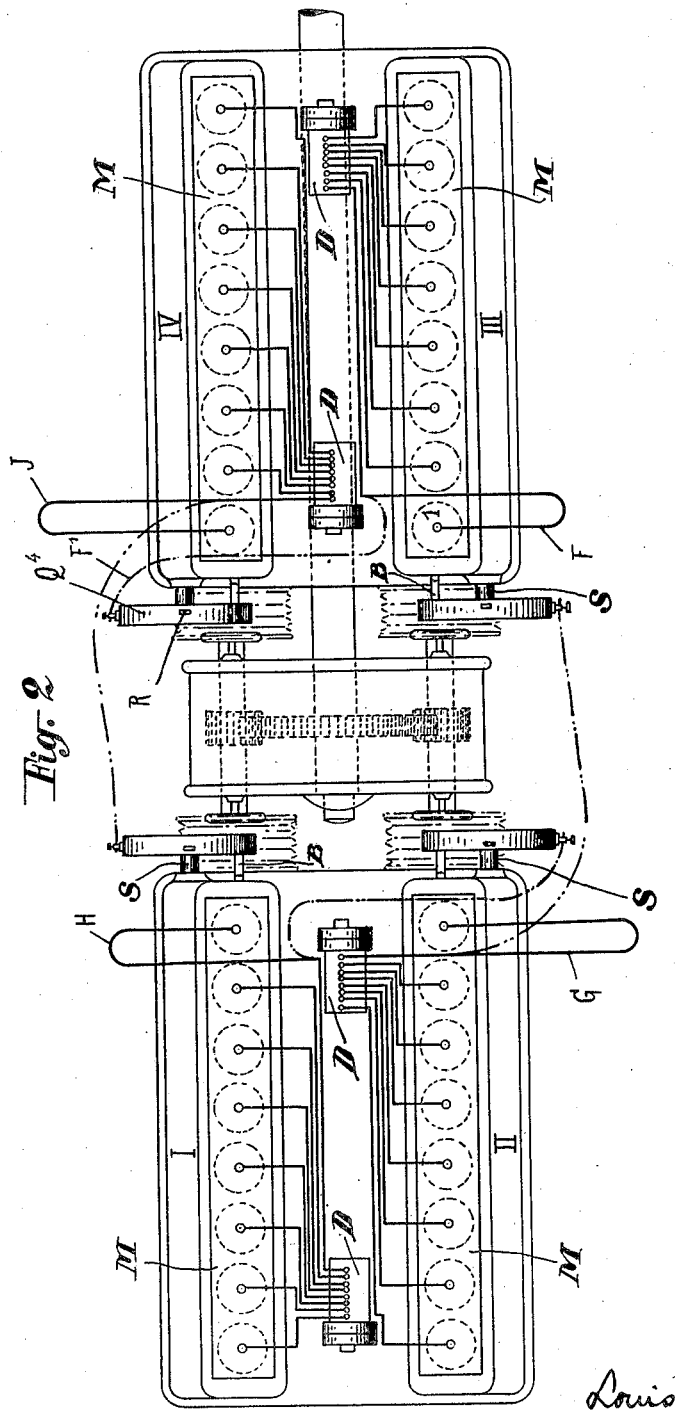

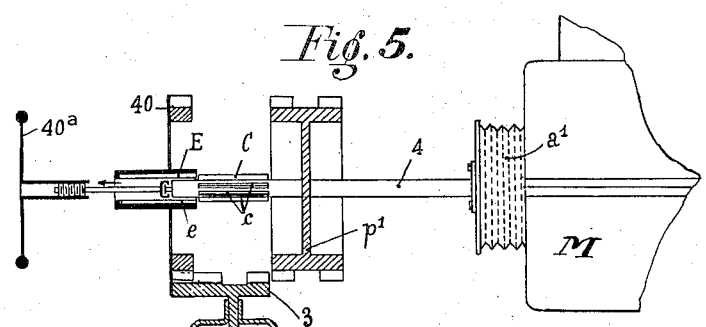
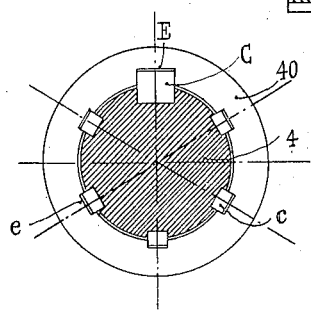
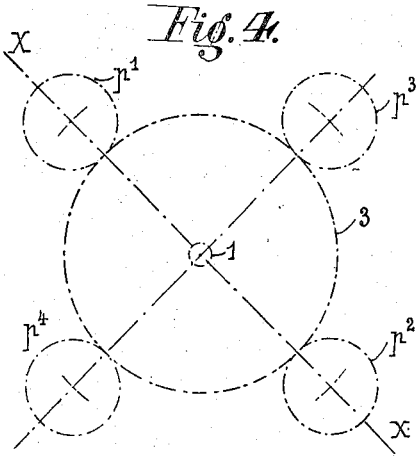
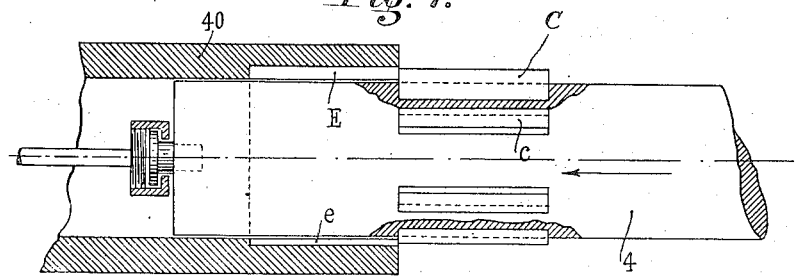

Patented Dec. 8, 1925.

1,564,516

UNITED STATES PATENT OFFICE.

LOUIS BREGUET, OF PARIS, FRANCE, ASSIGNOR TO SOCIÉTÉ ANONYME DES ATELIERS D'AVIATION LOUIS BREGUET, OF PARIS, FRANCE.

DEVICE FOR THE AUTOMATIC COUPLING AND UNCOUPLING OF ENGINES OPERATING UPON A COMMON PROPELLER.

Application filed December 22, 1921. Serial No. 524,211.

*To all whom it may concern:*

Be it known that I, LOUIS BREGUET, a citizen of France, and a resident of Paris, France, have invented new and useful Improvements in Devices for the Automatic Coupling and Uncoupling of Engines Operating upon a Common Propeller, which is fully set forth in the following specification.

This invention relates to the coupling and uncoupling of one or more motors or groups of motors with respect to a shaft which transmits the power of one or more of said motors to any drive means, as for example, an aeroplane propeller.

It is highly desirable in power devices of the above type that each motor be connected to the propeller shaft, or other drive means, at accurately defined, relative positions in order that the explosions of the motors may be distributed in a suitable and uniform manner over a period, or predetermined number, of revolutions of said shaft, thereby avoiding shocks that might injure the latter. This function must be fulfilled independently of the number of individual couplings and uncouplings of each motor.

One of the objects of the present invention is to provide means such that the moment at which any one of the plurality of motors may be connected to the drive means may be easily and accurately determined. Other objects will be pointed out hereinafter.

In order that the invention may be more readily understood, reference is made to the accompanying drawings which are designed merely as illustrations to assist in the description of the invention, and not as defining the limits thereof.

In the drawings—

Fig. 1 is a schematic side elevation of a plurality of motors positioned to drive a common shaft;

Fig. 2 is a top plan view of the arrangement illustrated in Fig. 1;

Fig. 3 is a detail of one type of indicating means;

Fig. 4 is a diagrammatic view illustrating the arrangement of the motor driving gears and the common drive-means gear;

Fig. 5 is a schematic side elevation, partly in section, of one type of coupling and uncoupling means which may be employed;

Fig. 6 is an enlarged transverse sectional view of the keyed portion of one of the motor shafts; and Fig. 7 is an enlarged detail view of a portion of one of the motor shafts and its surrounding sleeve, the latter being shown in section.

Referring to the drawings, wherein like reference characters refer to like parts throughout the several views, and particularly to Figs. 4 to 7, inclusive, 1 illustrates a common drive shaft having secured thereto in any suitable manner a drive gear 3 which is positioned for engagement with a plurality of motor driving pinions $p^1$, $p^2$, $p^3$, $p^4$ positioned at regular intervals around gear 3. As shown in Fig. 5, the driven gear 3 has permanent engagement with a toothed sheath or sleeve 40, which is equiaxial with pinion $p^1$, and which is mounted on shaft 4 of one of a plurality of motors M. While only one sleeve 40 has been illustrated in Fig. 5, it will be understood that each motor to be connected to shaft 1 is provided with a similar sleeve and a shaft 4, which latter is resiliently connected in any suitable manner, as by means of a drive member $a^1$ of the type described in my French Patent No. 525,384, dated Oct. 14, 1921.

Secured in any suitable manner to motor shaft 4 is a hand-wheel $40^a$ for enabling an operative to move shaft 4 longitudinally in order to bring pinion $p^1$, rigidly attached to shaft 4, into engagement with gear 3 in a manner which has been described in my French patent referred to above. From an inspection of Figs. 5, 6 and 7, it will be readily apparent that when the operative pulls shaft 4 in the direction of the arrow (Fig. 7) by means of hand-wheel $40^a$, pinion $p^1$ will be drawn into engagement with gear 3 and keys C, c will engage key-ways E, e formed in the hub portion of sleeve 40. Since key C is larger than keys c, it is evident that an advance of shaft 4 to the left, as viewed in Fig. 5, and a meshing of pinion $p^1$ with gear 3 can only take place when key C is in front of groove E of sleeve 40.

The present invention is directed more particularly to means whereby an operative may readily determine, when it is desired to couple one of the motors with the common drive shaft, the instant hand-wheel $40^a$ should be actuated in order that the coupling may be made without placing an unnecessary strain on the propeller shaft, and in order to distribute the explosions of said motors in a uniform manner throughout a predetermined number of revolutions of the shaft.

Referring now more particularly to Figs. 1 to 3, inclusive, P is a metal pointer or indicator of any desired type which is rigidly secured in an accurately determined position to the end of a counter-shaft S of each of the motors. In the present instance, and preferably, counter-shaft S is the usual cam shaft of an internal combustion motor which rotates at one-half the speed of the crank-shaft. Secured in any suitable manner, as by means of brackets B, to the cylinder casting, or other fixed member, is an insulated metal ring Q within which metal pointer P rotates, one end of said pointer P being closely adjacent the inner periphery of said ring Q. The setting of pointer P upon each of the cam shafts is carried out in a manner to be described hereinafter.

When the ring Q of the indicator device of one of the motors to be coupled to propeller shaft 1 is connected with one of the electrical distributing terminals F of one of the motor ignition dynamos D, that is, one of a motor already coupled to shaft 1, and, admitting that the engine to be coupled shall rotate at exactly the same speed as the others, then on each second revolution of shaft 4 there will be produced a spark between the ring Q and indicator P. The position of this spark will naturally depend on the relative angular position of the cam shafts of the two motors involved and can be determined by experiment during the factory testing of the engine. If, at the moment of the coupling of the motor, shaft 4 is guided into sleeve 40 in the proper position, that is, so that the power impulses of each motor are evenly distributed over two revolutions of shaft 4, the spark will take place at the predetermined point, if, however, on the contrary, shaft 4 is inserted one revolution too early or too late in the coupling sleeve, the spark will take place at a point situated diametrically opposite the predetermined point above mentioned.

Therefore, in order to obtain a suitable coupling, that is, one which will correspond to the sequence of the ignition effects, it is necessary to make the coupling only when the spark comes opposite a predetermined point on ring Q. In practice the speed of the engine to be coupled is not exactly the same as that of the engine or engines already coupled. Whence it will result that the spark will be displaced around the periphery of the ring with an apparent speed representing one-half of the difference between the speeds of the engine to be coupled and the engines which have already been coupled.

If it be supposed for instance that the engine to be coupled rotates at 1960 revolutions per minute, and the other engines at 2000 revolutions, the spark will rotate in the contrary sense to the cam shaft of the engine to be coupled at the rate of $\frac{2000-1960}{2}=20$ revolutions per minute.

In this event it will be possible to admit a small amount of gas in order to increase the speed of the engine to be coupled and to bring the same near 2000 revolutions per minute, thus reducing the speed of rotation of the spark. In practice all that is necessary will be to reduce the speed of the spark to not more than ten revolutions. The succeeding operation will consist in acting upon the control device 40$^a$ used for the engine coupling, shortly before the spark comes opposite the standard mark R or predetermined point on the ring Q, for instance when the spark is in the position shown at $P^1$, Fig. 3, which is a front view of the ring Q and the pointed member P.

The coupling will take place when the key C comes opposite the notch E, this occuring exactly at the moment when the spark takes place opposite the mark R. It will be observed that it is impossible to have an error of one revolution of the crank shaft during the coupling operation, since it will suffice not to effect the coupling when the spark occurs at $P^2$ or the point diametrically opposite P.

The setting of the pointer P on the different cam shafts is carried out during the factory testing of the engine, and as will be set forth hereunder for the engine IV for instance. The four pinions $p^1$ $p^2$ $p^3$ $p^4$ being engaged with the central gear wheel 3, that is, the four engines being coupled, the engines are rotated by hand by operating upon any one of the same until one of the cylinders of the engine III is brought to the ignition point, for instance the cylinder numbered 1 in Fig. 2. The mark R consists of a line drawn at the end of the vertical diameter of the ring $Q^4$. The pointer $P^4$ is then set in the vertical position upon the cam shaft of the engine IV.

In these conditions if during the flight the engine IV has been uncoupled and it is desired to again couple the same, the wire F of the cylinder 1—which was used to set the pointed member—is connected with the ring $Q^4$, in the position $F^1$ shown in broken lines, and the coupling will be effected when the spark passes before the vertical mark R as above indicated. This will afford the certainty of obtaining exactly the same conditions as when the group was in proper operation at the time of the factory testing, and the ignition effects will take place at exactly equal intervals.

The conditions above stated for engine IV are applicable to other engines, that is, during the factory tests the pointed member on the cam shaft of engine III will be set by making use of the ignition point of any one of the cylinders of engine II, and the same is applicable in the case of the other engines.

It is obvious that the adjustment of the pointer may take place by making use of any other cylinder than the cylinders numbered 1, provided of course that during the flight and at the moment of coupling, use will be made of the ignition wires of the cylinders which have been employed to effect the setting at the time of the factory tests.

While one embodiment of the inventive idea has been illustrated and described with considerable particularity, it is to be distinctly understood that the drawings are for purposes of illustration only and are not designed as a definition of the limits of the invention, reference being had for this purpose to the appended claims.

I claim as my invention:—

1. An arrangement for coupling a plurality of motors to a common shaft, comprising, in combination, means for determining the relative angular position of the cam shafts of said motors, and means for connecting each motor separately with said common shaft.

2. In a device of the class described, the combination with a plurality of motors, of a common shaft, means for connecting each motor separately with said shaft, and means for determining the relative angular position of shafts of said motors turning at one-half the speed of the crank-shafts of the latter.

3. An arrangement for coupling and uncoupling a plurality of motors to and from a common shaft, comprising indicators secured in predetermined positions on the cam shafts of said motors, fixed rings in which said indicators turn and which may be connected to the ignition circuits of said motors, and a manually operable coupling for each motor for coupling the latter to said common shaft at the moment when a spark, which rotates around said ring at a speed equal to half the difference between the speed of the crank-shaft of the motor to be coupled and the crank-shafts of the motors already coupled, passes in front of a mark provided on the ring of the motor to be coupled.

4. A device of the class described comprising, in combination, a plurality of motors, a common drive shaft, an ignition circuit for each of said motors, an insulated member secured to each of said motors and adapted to be connected to one of said circuits other than the circuit of the respective motor, an indicating member secured to the cam shaft of each of said motors and adapted to rotate in indicating relation with said insulated member, and means for independently coupling each of said motors with said drive shaft.

5. A device of the class described comprising, in combination with a plurality of motors, a drive shaft, means for independently coupling and uncoupling each of said motors to and from said shaft, and means for indicating the instant said coupling means should be actuated in order to evenly distribute the power impulses of each of said motors over a predetermined number of revolutions of the crank-shafts of said motors.

6. A device of the class described comprising, in combination with a plurality of internal combustion engines, a drive shaft, means for independently coupling and uncoupling each of said engines to and from said shaft, and means, including a member secured to a counter-shaft of each of said engines, and a fixed member mounted adjacent each of said engines and having connection with one of the ignition circuits of said engines, for indicating the instant the coupling means should be actuated in order to evenly distribute the power impulses of said engines over a predetermined number of revolutions of the crank-shafts of said motors.

In testimony whereof I have signed this specification.

LOUIS BREGUET.